US012779940B2

(12) United States Patent
Gerrett et al.

(10) Patent No.: US 12,779,940 B2
(45) Date of Patent: Nov. 3, 2026

(54) OCCUPANT CLOTHING AND ANTHROPOMETRIC PREDICTOR FOR THERMAL EFFECTOR CONTROL

(71) Applicant: GENTHERM INCORPORATED, Novi, MI (US)

(72) Inventors: Nicola Gerrett, Royal Oak, MI (US); Zachary Grimaldi, Farmington Hills, MI (US); Daniel Guerithault, Dallas, TX (US)

(73) Assignee: GENTHERM INCORPORATED, Novi, MI (US)

( * ) Notice: Subject to any disclaimer, the term of this patent is extended or adjusted under 35 U.S.C. 154(b) by 17 days.

(21) Appl. No.: 19/099,954

(22) PCT Filed: Aug. 1, 2023

(86) PCT No.: PCT/US2023/029183
§ 371 (c)(1),
(2) Date: Jan. 30, 2025

(87) PCT Pub. No.: WO2024/030413
PCT Pub. Date: Feb. 8, 2024

(65) Prior Publication Data

US 2026/0034852 A1 Feb. 5, 2026

Related U.S. Application Data

(60) Provisional application No. 63/394,790, filed on Aug. 3, 2022.

(51) Int. Cl.
*B60H 1/00* (2006.01)
*G06V 10/143* (2022.01)
(Continued)

(52) U.S. Cl.
CPC ....... *B60H 1/00742* (2013.01); *G06V 10/143* (2022.01); *G06V 10/764* (2022.01); *G06V 20/597* (2022.01); *G06V 40/172* (2022.01)

(58) Field of Classification Search
None
See application file for complete search history.

(56) References Cited

U.S. PATENT DOCUMENTS 5,170,935 A * 12/1992 Federspiel ............... F24F 11/63 236/94
9,409,461 B2 8/2016 Wang et al.
(Continued)

FOREIGN PATENT DOCUMENTS

CN 106515352 A 3/2017
DE 102018220467 A1 5/2020
(Continued)

OTHER PUBLICATIONS

International Search Report and Written Opinion for International Application No. PCT/US2023/029183 mailed Nov. 24, 2023.
(Continued)

*Primary Examiner* — Daniel L Greene
(74) *Attorney, Agent, or Firm* — Carlson, Gaskey & Olds, P.C.

(57) ABSTRACT

A microclimate control system for an occupant includes a component that has a thermal effector that is configured to provide thermal conditioning to an occupant. An image capture unit is configured to receive an image of the occupant. A controller is in communication with the image capture unit, the controller includes an extractor algorithm that is configured to extract occupant personal parameters based upon the image. The controller includes a first estimator that is configured to predict an occupant clothing insulation value based upon the occupant personal parameters, and a second estimator is configured to predict occu-
(Continued)

pant anthromorphic characteristics based upon the occupant personal parameters. The controller is configured to regulate the thermal effector based upon the occupant clothing insulation value and the occupant anthromorphic characteristics.

20 Claims, 3 Drawing Sheets

(51) Int. Cl.

| | |
|---|---|
| ***G06V 10/764*** | (2022.01) |
| ***G06V 20/59*** | (2022.01) |
| ***G06V 40/16*** | (2022.01) |

(56) References Cited

U.S. PATENT DOCUMENTS

| | | | | |
|---|---|---|---|---|
| 9,889,770 | B2 | 2/2018 | Hotary et al. | |
| 2008/0142713 | A1 | 6/2008 | Breed et al. | |
| 2014/0093133 | A1 | 4/2014 | Frank et al. | |
| 2014/0148706 | A1 * | 5/2014 | Van Treeck .......... | A61B 5/0075 600/474 |
| 2015/0025738 | A1 * | 1/2015 | Tumas ............... | B60H 1/00742 701/36 |
| 2021/0232834 | A1 | 7/2021 | Neveu et al. | |
| 2022/0009308 | A1 | 1/2022 | Neveu et al. | |
| 2023/0079510 | A1 * | 3/2023 | Androulakis ........ | B60N 2/0024 701/36 |

FOREIGN PATENT DOCUMENTS

| | | | |
|---|---|---|---|
| EP | 2720607 | B1 | 11/2015 |
| WO | 2021206887 | A1 | 10/2021 |
| WO | 2021216234 | A1 | 10/2021 |

OTHER PUBLICATIONS

International Preliminary Report on Patentability for International Application No. PCT/US2023/029183 mailed Nov. 22, 2024.

* cited by examiner

OCCUPANT CLOTHING AND ANTHROPOMETRIC PREDICTOR FOR THERMAL EFFECTOR CONTROL

CROSS-REFERENCE TO RELATED APPLICATION

This application claims priority to U.S. Provisional Patent Application No. 63/394,790 filed Aug. 3, 2022.

BACKGROUND

This disclosure relates to an occupant clothing and anthropometric predictor for thermal effector control, for example, for use in a vehicle.

HVAC systems (i.e., macroclimate system) are widely used in vehicles to control the temperature in the vehicle and increase occupant thermal comfort. Common vehicle microclimate devices or thermal effectors (i.e., devices in close proximity to the occupant and/or not used to thermal condition the cabin) include heated and/or cooled seats, a heated steering wheel, foot-well and neck thermal blowers. Such thermal effectors offer a more personalized and effective strategy to bring occupants to comfort more quickly than bulk thermal conditioning provided by an HVAC system.

The effectiveness of microclimate thermal effector is dependent upon several factors, with a major factor being the proximity of the device to the occupant. Proximity includes not only distance between the thermal effector and the occupant, but also effective proximity related to the insulative effects from occupant clothing. Another important factor relates to occupant anthropology (e.g., sex, age, culture, etc.), which has a statistically significant impact as to how the occupant perceives thermal comfort.

Unfortunately, most microclimate systems (and macroclimate systems) do not automatically account for the specific characteristics of the occupant(s) present in the vehicle (i.e., clothing and anthropology). If they are, these characteristics are estimated based on the season (e.g., summer/winter) and the sex of the occupant (male/female, which may indicate clothing habits). Instead, typical microclimate systems rely upon occupant-selected discrete settings, which must be adjusted by the occupant to achieve occupant thermal comfort.

SUMMARY

In one exemplary embodiment, a microclimate control system for an occupant includes a component that has a thermal effector that is configured to provide thermal conditioning to an occupant. An image capture unit is configured to receive an image of the occupant. A controller is in communication with the image capture unit, the controller includes an extractor algorithm that is configured to extract occupant personal parameters based upon the image. The controller includes a first estimator that is configured to predict an occupant clothing insulation value based upon the occupant personal parameters, and a second estimator is configured to predict occupant anthromorphic characteristics based upon the occupant personal parameters. The controller is configured to regulate the thermal effector based upon the occupant clothing insulation value and the occupant anthromorphic characteristics.

In a further embodiment of any of the above, the component is a seat.

In a further embodiment of any of the above, the component is one of a steering wheel, a shift knob, a floor mat, and a headliner.

In a further embodiment of any of the above, the thermal effector is one of a thermoelectric device, a vent, a micro-compressor, and a heater.

In a further embodiment of any of the above, the image capture unit is provided by at least one of a video camera and an infrared camera.

In a further embodiment of any of the above, the image capture unit is provided by a video camera of a driver monitoring system.

In a further embodiment of any of the above, the first estimator is configured to identify an occupant article of clothing, and the first estimator is configured to determine the occupant clothing insulation value for the occupant article of clothing in a look up table.

In a further embodiment of any of the above, the occupant article of clothing is used to predict a presence of another article of clothing, the first estimator is configured to determine another occupant clothing insulation value for the other occupant article of clothing in the look up table.

In a further embodiment of any of the above, the system includes climate data that corresponds to one of an exterior ambient temperature sensor, a navigation positional sensor and a weather data source. The first estimator is configured to identify an occupant article of clothing based upon the climate data.

In a further embodiment of any of the above, the occupant personal parameter includes a distance from the thermal effector.

In a further embodiment of any of the above, the system includes a seat adjuster that has a position sensor that is in communication with the controller. The second estimator is configured to predict the occupant anthromorphic characteristics based upon the position sensor and the occupant personal parameters are extracted from the image.

In a further embodiment of any of the above, the extractor algorithm is configured to provide distance data relating to occupant physical features that predict the occupant anthromorphic characteristics.

In a further embodiment of any of the above, the occupant physical features include one of shoulder width, hip width, torso length, neck position, head position.

In a further embodiment of any of the above, the extractor algorithm is configured to perform facial recognition, and the second estimator is configured to predict one occupant age, occupant gender and occupant weight.

In another exemplary embodiment, a method of controlling an occupant microclimate system, the method includes capturing an image of an occupant, extracting occupant personal parameters based upon the image, estimating an occupant clothing insulation value based upon the occupant personal parameters, estimating an occupant anthromorphic characteristic based upon the occupant personal parameters, and regulating a thermal effector of a component based upon the occupant clothing insulation value and the occupant anthromorphic characteristic.

In a further embodiment of any of the above, the component is one of a seat, a steering wheel, a shift knob, a floor mat, and a headliner. The thermal effector is one of a thermoelectric device, a vent, a micro-compressor, and a heater.

In a further embodiment of any of the above, the first estimator is configured to identify an occupant article of clothing, and the first estimator is configured to determine the occupant clothing insulation value for the occupant article of clothing in a look up table.

In a further embodiment of any of the above, the occupant personal parameter includes a distance from the thermal effector.

In a further embodiment of any of the above, the extractor algorithm is configured to provide distance data relating to occupant physical features that predict the occupant anthromorphic characteristics, and the occupant physical features include one of shoulder width, hip width, torso length, neck position, head position.

In a further embodiment of any of the above, the extractor algorithm is configured to perform facial recognition and predict one occupant age, occupant gender and occupant weight.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

The effectiveness of microclimate devices is dependent upon several factors, including the proximity of these devices to an occupant. The effects of proximity are influenced by the occupant's anthropometry and the clothing they are wearing. The disclosed microclimate control system incorporates a more accurate, highly integrated control system and method for automatically regulating thermal effector(s) in close proximity to the occupant.

Figure 1:
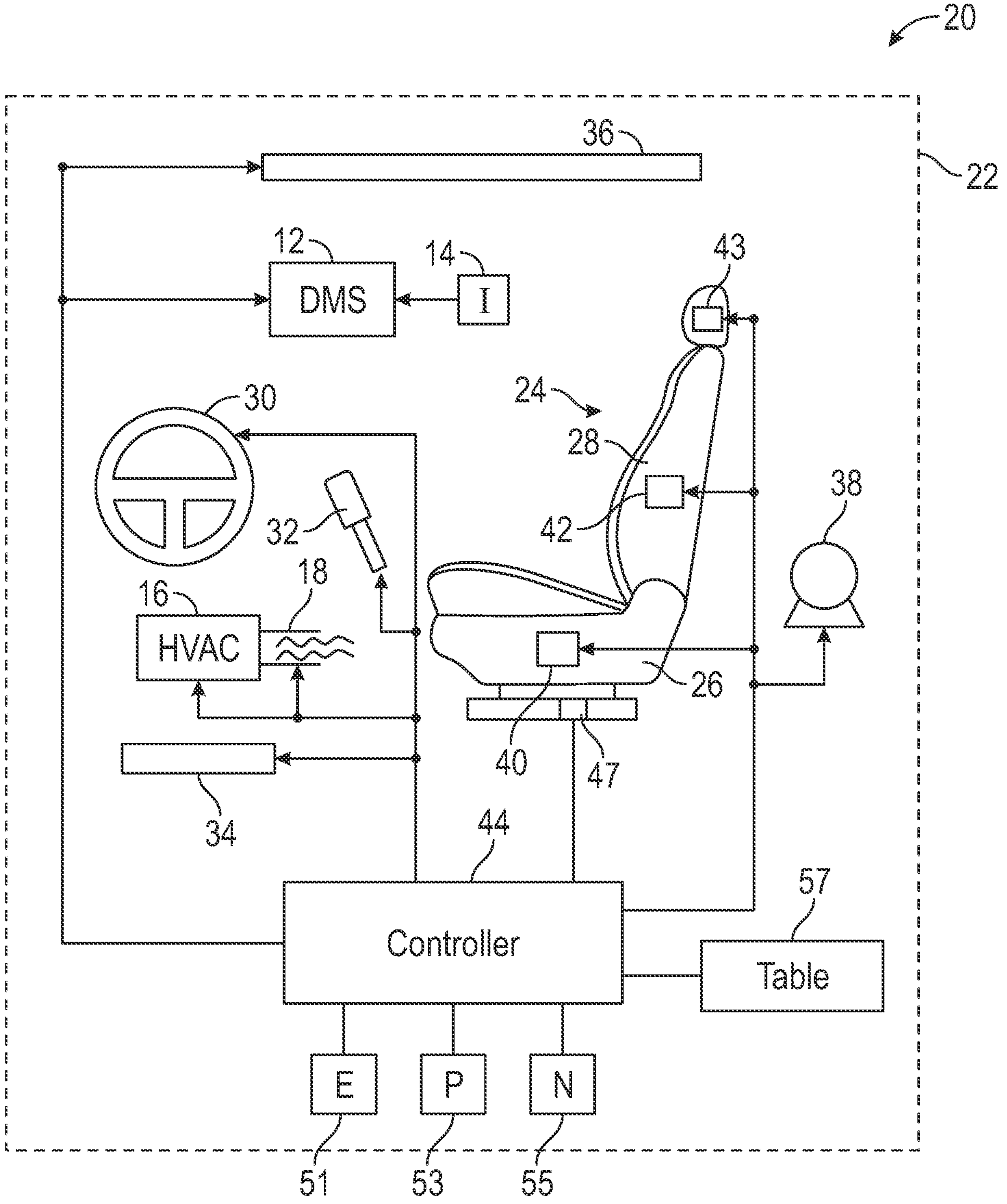
FIG. 1 is a schematic depicting a vehicle microclimate control system for a seated occupant.

An example portion of a vehicle microclimate control system 20 is shown schematically in FIG. 1. Within the cabin 22 of a vehicle, the microclimate control system 20 includes numerous components that are in close proximity to the occupant and which can be used to effectively and efficiently thermally condition the regions immediately surrounding or contacting the occupant. Example components include a seat 24 (with cushion 26, back 28 and headrest), a steering wheel 30, a shifter 32, a mat 34 (such as a floor mat, a door panel, and/or a dash panel), a headliner 36, and a microcompressor system 38 (for example, found in hybrid or electric vehicle applications). Each of these components may include one or more thermal effectors (e.g., a heating device and/or a cooling device) to provide desired thermal conditioning to the occupant. A portion of the HVAC system 16 includes a vent 18 near the occupant (e.g., footwell vent) that can be regulated independent from the remainder of the HVAC system to provide desired heating/cooling to a particular occupant without affect the thermal condition of other occupants in the cabin 22.

With reference to an exemplary seat 24, a cushion thermal effector 40 is provided in the cushion 26, a back thermal effector 42 is provided in the back 28, and a thermal effector 43 is provided in the headrest. These thermal effectors may be provided by a thermoelectric device (TED), a heater (e.g., PTC or resistive heating mat), and/or a vent that can be positioned by a motor, for example, to direct conditioned air to the occupant.

The system 20 includes a controller 44 that may comprise one or more processors and hardware and/or software. In some examples, the controller 44 includes communication hardware for communicating data with a remote processing system. The controller 44 is in communication with the various components and/or thermal effectors. One or more seat position sensors 47 are in communication with the controller 44 and provide the seat position, which is useful for determining the distances of the occupant from a component (and, thus, thermal effector) and/or inferring the size of the occupant. Inputs, such as environmental sensors (temperature sensors) 51, personal devices (phones, fitness trackers, etc.) 53 and/or navigational devices 55, are in communication with the controller 44 and may provide information useful for determining occupant personal parameters, such as age, gender, culture, fitness level, height, weight, etc.

Increasingly, vehicles have begun to incorporate driver monitoring systems (DMS) 12 to determine occupant drowsiness and the driver's gaze, for example, to increase driver safety. In one example, the DMS 12 includes an image capture unit 14, which may be part of a video camera and/or infrared camera. The captured image used by the disclosed system 20 may be a single image from a camera or a frame from a video stream. The image capture unit 14 is arranged within the cabin 22 and is typically aimed at the driver's eyes to provide DMS functionality. In the disclosed system 20, the image capture unit 14 may have a wider angle than a typical DMS camera in order to capture a larger portion of the occupant, for example, the torso, shoulders, arms, neck and/or head. More than one image capture may be used, and image capture units of different types by be employed to enhance or increase the information that can be gathered.

Figure 2:
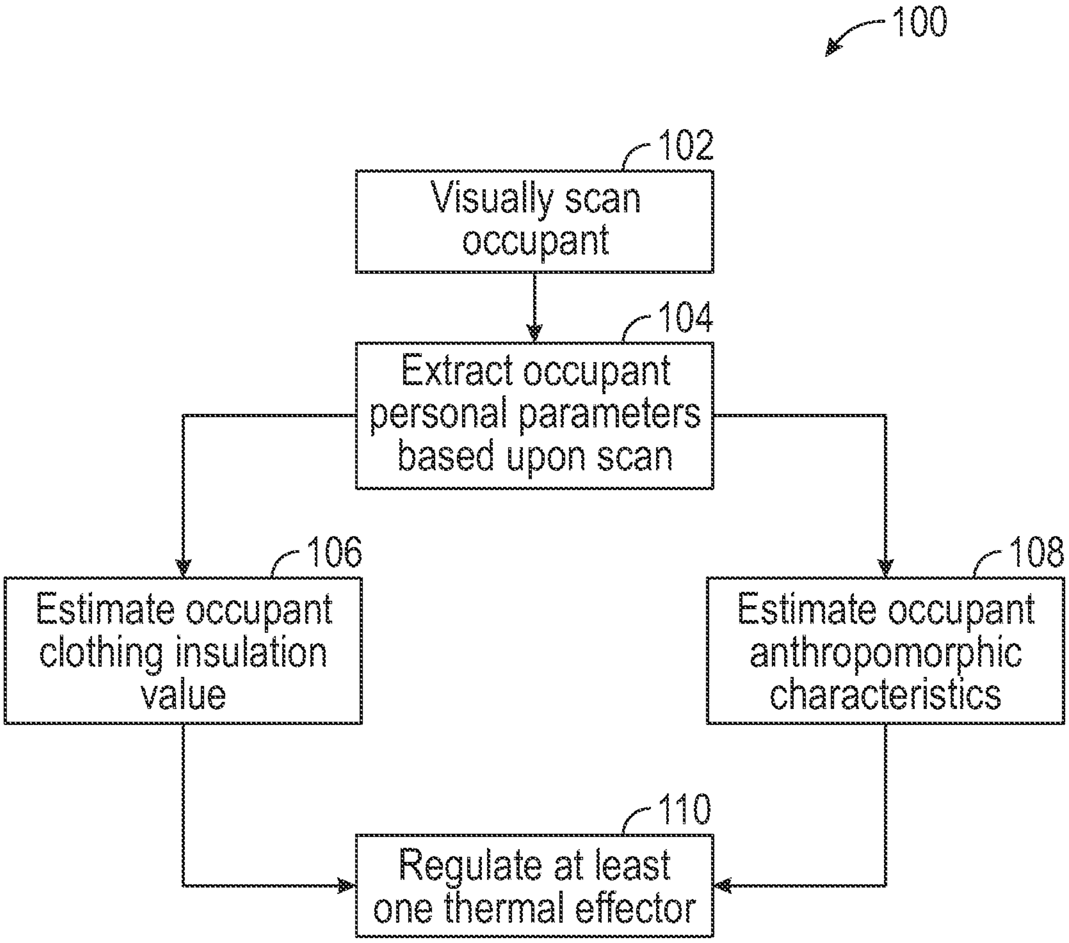
FIG. 2 is a flow chart depicting an example method of controlling an occupant microclimate system.

Referring to FIG. 2, an example method 100 of controlling the microclimate control system 20 is shown. The method 100 visually scans the occupant (block 102) to capture an image of an occupant using the image capture unit 14. The captured image includes the occupant's face, neck, torso and/or arms, for example. The controller 44 extracts occupant personal parameters based upon the scanned image (block 104). In cases where machine learning is used, the captured image(s) may be compared to those stored in a database that is in communication with the controller 44 in order to recognize articles of clothing or other known references, for example. For example, a pre-trained model may be used, which could be deployed before or during the life of the vehicle. Such a model could be continually improved to "specialize" or "personalize" the, for example, to learn the owner of the vehicle and regular passengers. The database thus may contain data from the regular occupant and/or the general population, and may include any form of image data storage and classification reference data. An occupant clothing insulation value is estimated based upon the occupant personal parameters (block 106), and occupant anthromorphic characteristics are estimated based upon the occupant personal parameters (block 108). Using the occupant clothing insulation value and the occupant anthromorphic characteristics, one or more thermal effectors of a component can be automatically regulated (block 110) to provide highly personalized occupant thermal comfort.

Figure 3:
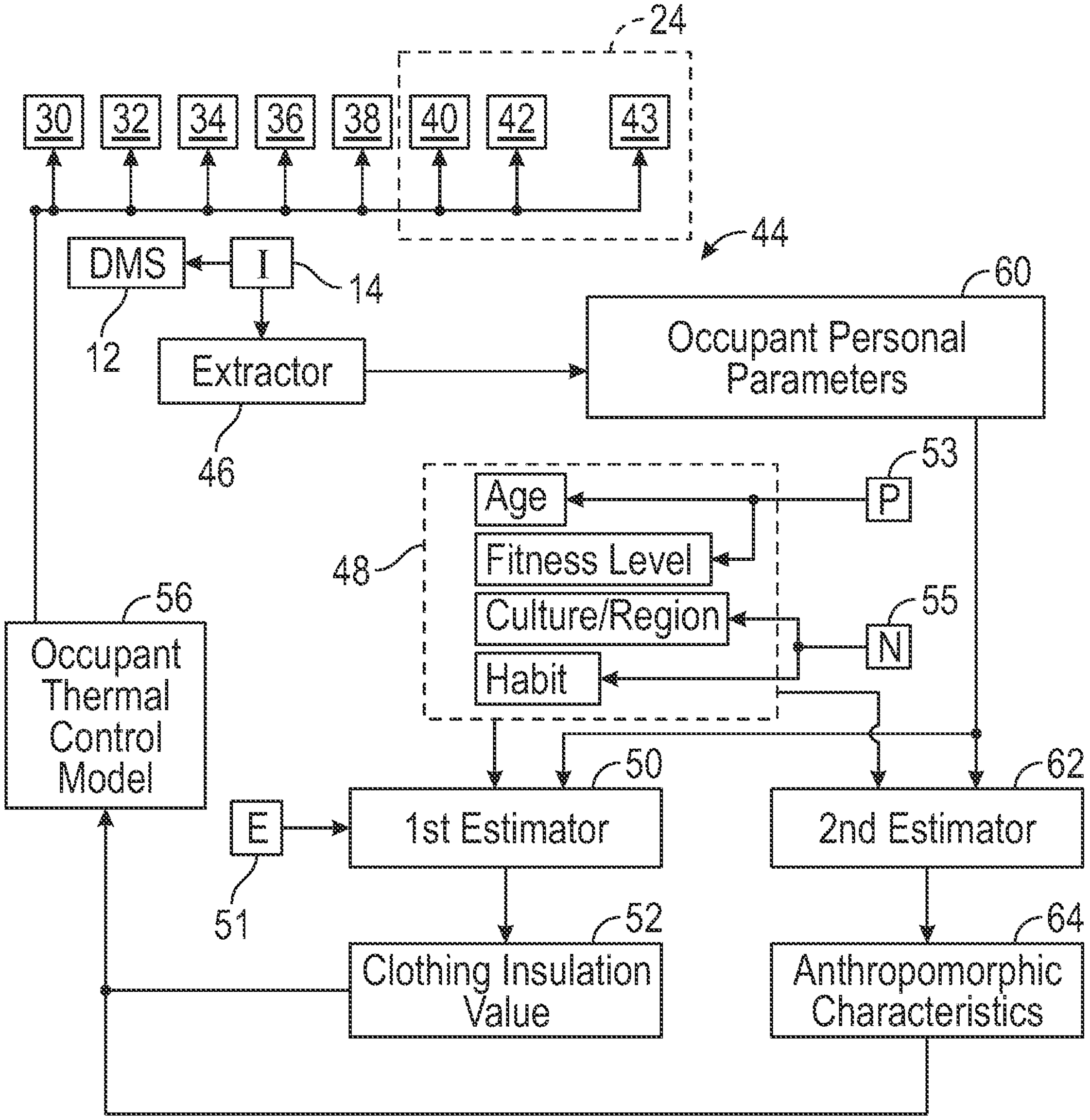
FIG. 3 schematically illustrates the controller used for the vehicle microclimate control system.

The controller 44 for the system 20 is shown schematically in FIG. 3. Using information extracted from images using an extractor algorithm 46, occupant personal parameters 60 are used to ultimately determine occupant clothing insulation value(s) 52 and occupant anthromorphic characteristics 64, which are then fed to an occupant thermal control module 56 that regulates one or more component's thermal effector 30, 32, 34, 36, 38, 40, 42, 43.

In operation, at least one in-car camera (such as for a DMS) is directed towards the occupants (at least a driver) of the vehicle. The extractor algorithm 46 uses image classification and AI to gather occupant personal parameters 60 such as anthropometric data (e.g. torso height, shoulder span, personal characteristics (e.g. sex, age)) and clothing worn (e.g. material type, body coverage area, etc.) to control the heat transfer between the thermal effector and the occupant.

In one example, the extractor algorithm uses basic image classification (i.e. person is wearing a hat, long sleeve shirt, jeans). The extracted occupant personal parameters 60 are then fed into a first estimator 50 that estimates an occupant clothing insulation value 52 for the seated occupant. The control strategy disclosed herein is based upon the assumption that humans are expected to add or remove clothing insulation to their bodies according to environmental and personal physiological parameters. According to the Harris-Benedict principle, such personal physiological parameters include weight, height, gender, age, and fitness level.

The first estimator 50 may align the identified clothing with a Table 57, for example, a data set from ISO 9920 "Ergonomics of the thermal environment—Estimation of thermal insulation and water vapour resistance of a clothing ensemble" to estimate clothing insulation of different body sites and adjust climate control more efficiently. If the image capture unit 14 cannot see the lower body, another algorithm may use the upper body clothing data (along with the seasons, the age, the sex of the occupant) to make a better prediction of local and whole-body clothing insulation. In this disclosure, predicted "clothing insulation value" may also include the effects of hair, masks, blankets or other objects that create a thermal barrier, and the image capture unit 14 is used to detect these objects. Using image classification software/technology, we can extract information such as the clothing worn (e.g. cotton T-shirt, short sleeve, gloves, short hair). This information is transformed to a meaningful value using simple look up tables, database or a calculation engine. For example, the ISO 9920 contains an extensive list of normative data for the thermal insulation values for a wide variety of clothing ensembles.

Clothing insulation is to a large extent an unused parameter in thermal comfort systems, although it is a very significant one. Generally, thermal comfort related testing in the automotive sector over-regulates based upon clothing. Furthermore, existing computer simulated models of thermal comfort are evaluated at a specific value of clothing insulation, providing a "one size fits all" approach. The disclosed method predicts a clothing level of the occupant and customizes the activation and control strategy of components providing thermal comfort (i.e., thermal effectors including seat heaters, neck warmer, etc). This clothing insulation value 52 is then used for the thermal comfort models used to control the thermal effectors, which provide a more accurate personal occupant comfort. In some examples, the first estimator 50 can be local to a vehicle ECU. In other examples, the first estimator 50 can be remote from the vehicle and some or all of the calculations are performed via a distributed computing service, cloud computing, and/or a remote processor.

Furthermore, a reading of the environmental temperature is used, and other available information may also be referenced. More clothing is generally worn in colder temperatures, and less clothing is generally worn in warmer temperatures. To this end, an environmental sensor 51 is exposed to air outside of the vehicle. The environmental sensor provides environmental data, which may be provided over a CAN or LIN bus, based upon at least one of outside air temperature and outside humidity. It should be understood that the environmental data may instead be provided by a transfer function based upon other inputs indicative of outside air in some examples. This environmental data is used to infer the effects of clothing selection by the occupant which may be used to adjust the occupant clothing insulation value beyond the value estimated from the pressure distribution on the seat.

Some of the occupant personal parameters may not need to be estimated as they may be derived from other sources. Personalized devices 53, such as cell phones and watches, are also able to communicate with the controller 44 to provide relevant data to the estimator 50. Such data may include occupant age or location data from navigational tools 55, which can be used to determine occupant culture/region and/or occupant habits. For example, occupant's habits can give a snap-shot of the thermal sensitivity of a person (e.g., what a person wears for a long run) and can be used to analyze and personalize the occupant experience based on these detected preferences. For example, if the weather outside is warm but a person wears long sleeves then they may be thermally insensitive to warmth. Or vice versa, when it is cold outside and somewhere wears short sleeves, they might be thermally insensitive to cold. Occupant fitness may be provided as an additional occupant personal parameter, for example, using heart rate and heart rate variability (HRV) indices. Other information may be available with user consent, including, for example, illness symptoms (e.g., fever), pain levels, medication, activity tracking, menstrual cycle tracking, recent sleep, etc. The assessment cannot be done in a one-off fashion; an occupant is tracked over a period of time and then compared against a database/known data. Personal devices like watches or fitness trackers are suitable for this purpose. The comparison can be local to the vehicle or remote via a distributed computing system. The fitness level aspect of the estimator algorithm can be used when the statistical confidence becomes significant.

The amount of clothing worn by the occupant may also be affected by cultural preferences and regional considerations. That is, some cultural/regional preferences may indicate less or more clothing is worn by the occupant. To this end, the navigation tools 55 is used in some examples to provide the occupant and/or vehicle location, which can be used to infer the climate, region, culture and/or environmental data.

The vehicle location can be used to infer occupant habits, such as the occupant habitually visiting a fitness center, which can affect the occupant's clothing choices. For example, the occupant may be hot and sweaty when leaving a fitness center such that less clothing is worn by the occupant than would otherwise be predicted from the environmental data and/or the estimated occupant clothing insulation value.

The clothing insulation value 52 may be provided to the thermal control model as a class or category. One example classification is provided in the Table below, which is a byproduct of performing a nonlinear regression analysis on data including environmental temperature, weight, height ad ender.

| CLASS | CLOTHING VALUE | CLOTHING CONDITION |
|---|---|---|
| 0 | <0.6 | Little clothing |
| 1 | 0.6-0.8 | |
| 2 | 0.8-1.0 | Moderate clothing |
| 3 | 1.0-1.2 | |
| 4 | >1.2 | Heavily clothed |

The disclosed method and system is able to estimate the clothing insulation value due to the strong correlation captured by the combined effect of environmental temperature, occupant height, occupant weight, occupant sex. This correlation may be further strengthened by also providing age and other occupant personal parameters as inputs into the estimator 50, although these additional occupant personal parameters generally have only a slight effect on the estimated clothing insulation value compared to the combined effect of environmental temperature, occupant height, occupant weight, and occupant gender.

Ultimately, the clothing insulation value 52 is fed into an occupant thermal control module 56 that is used to regulate the various thermal effectors. One or more individual occupant personal parameters 48 may be fed into the thermal control module 56 for use. The thermal effectors include, for example, the seat 24, a steering wheel 30, a shifter 32, a mat 34 (such as a floor mat, a door panel, and/or a dash panel), a headliner 36, a microcompressor system 38, a cushion thermal conditioner 40, back thermal conditional 42 and/or neck/head thermal conditioner 43. The occupant thermal control model 56 may be based upon equivalent homogeneous temperature (EHT), which uses the clothing insulation value 52 in its modeling of the heat transfer between the occupant and the occupant's environment. One such embodiment is described in "THERMOPHYSIOLOGICALLY-BASED MICROCLIMATE CONTROL SYSTEM", international application number PCT/US21/16723, filed on Feb. 5, 2021 and which is herewith incorporated by reference in its entirety. Of course, approaches other than those based upon EHT may be used to achieve occupant thermal comfort.

The clothing insulation value 52 that the first estimator 50 is able to provide the occupant thermal control model 56 is useful in providing automatic thermal regulation, but somewhat limited. There are other factors that affect the accuracy of the clothing insulation value estimate. This estimate can be made more accurate by providing additional occupant personal parameters and anthromorphic characteristics 64, such as occupant size, occupant weight, occupant age, occupant culture/region and/or occupant habit, from a second estimator 62 to the occupant thermal control module 56.

The image capture unit 14 can provide images of the occupant that can be processed to obtain distance data, such as occupant distance from a thermal effector, occupant physical features (e.g., shoulder width, hip width, torso length, neck position, head position, etc.). In one example, the extractor algorithm 46 is configured to perform facial recognition. The second estimator 62 is configured to predict one occupant age, occupant gender and occupant weight based upon the physical features.

In one example, a seat adjuster having a position sensor 47 (FIG. 1) is in communication with the controller 44. This information is useful, for example, in estimated occupant height and estimating the distance of the occupant from a thermal effector, such as a floor vent. The second estimator 62 is configured to predict the occupant anthromorphic characteristics 64 based upon the position sensor 47 and the occupant personal parameters 60 extracted from the image. This information can be compared to the dimensions of the seat to determine how close the occupant is to an effector and make any adjustments accordingly.

Example 1: Neck Blower

The position of the neck blower depends on occupant seat/head rest position and occupant torso height relative to this. Occupants with shorter torso may not feel the benefit of a neck device because it could be positioned at the level of the head. This is a common problem with female occupants. For a neck blower to be effective it should target the thermally sensitive, and (often) bare skin of the posterior neck. The occupant may be able to re-position the head rest manually, but this may not work if the seat design does not allow it. If the occupant's sitting height is determined, or if they have long hair, are wearing a scarf or turtleneck, then system 20 could determine whether to turn off/on or adjust the neck device. If the neck device has an electronic adjustment to change the airflow direction, the system 20 could change the airflow direction, based on their sitting height to direct air towards the neck.

Example 2: Footwell Heater

The position of the footwell varies in each car; sometimes it is positioned under the seat, directed towards the back of the lower legs, sometimes it is under the front panel, directed towards the front of the lower legs. Regardless of the position of the device in the vehicle, it will still only be effective if it is in close proximity to the occupant's lower legs and feet. Males and females tend to sit with a different sitting position (wide vs. narrow) and the drivers leg positions will differ in position to passengers. The system 20 can gather this information from the image capture unit 14, and then adjust (turn on/off/change airflow direction) the thermal effector to target the occupant and offer an effective and efficient strategy.

Example 3: Seat Heaters/iMTM

In temperature-controlled seats, no adjustment is made to the heat transfer to the occupant. How much of the seat is being covered by the occupant is not taken into consideration when regulating the seats temperature (heat transfer). Smaller individuals (e.g., smaller should span, hip width etc.) will occupy less of the seat than a larger individual. The system 20 can gather an image of the occupant, identify key body landmarks (e.g. shoulders), measure the body size, and then estimate how much of the seat they occupy and control heat transfer from the seat accordingly.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

It is understood that any of the method steps can be performed in virtually any order. Moreover, one or more of the following method steps can be combined with other steps; can be omitted or eliminated; can be repeated; and/or can separated into individual or additional steps.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. Other combinations are also possible as will be gleaned from the following claims, which are also hereby incorporated by reference into this written description. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer, or section from another region, layer, or section. Terms such as "first", "second", and other numerical terms when used herein do not imply a sequence or order unless clearly indicated by the context. Thus, a first element, component, region, layer, or section discussed below could be termed a second element, component, region, layer, or section without departing from the teachings.

Spatially relative terms, such as "inner", "outer", "beneath", "below", "lower", "above", "upper", and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

What is claimed is:

1. A microclimate control system for an occupant, comprising:

a component having a thermal effector configured to provide thermal conditioning to an occupant;

an image capture unit configured to receive an image of the occupant;

a controller in communication with the image capture unit, the controller includes an extractor algorithm configured to extract occupant personal parameters based upon the image;

wherein the controller includes a first estimator configured to predict an occupant clothing insulation value based upon the occupant personal parameters, and a second estimator configured to predict occupant anthromorphic characteristics based upon the occupant personal parameters; and wherein the controller is configured to regulate the thermal effector based upon the occupant clothing insulation value and the occupant anthromorphic characteristics.

2. The system of claim 1, wherein the component is a seat.

3. The system of claim 1, wherein the component is one of a steering wheel, a shift knob, a floor mat, and a headliner.

4. The system of claim 1, wherein the thermal effector is one of a thermoelectric device, a vent, a micro-compressor, and a heater.

5. The system of claim 1, wherein the image capture unit is provided by at least one of a video camera and an infrared camera.

6. The system of claim 5, wherein the image capture unit is provided by a video camera of a driver monitoring system.

7. The system of claim 1, wherein the first estimator is configured to identify an occupant article of clothing, and the first estimator configured to determine the occupant clothing insulation value for the occupant article of clothing in a look up table.

8. The system of claim 7, wherein the occupant article of clothing is used to predict a presence of another article of clothing, the first estimator configured to determine another occupant clothing insulation value for the other occupant article of clothing in the look up table.

9. The system of claim 7, comprising climate data corresponding to one of an exterior ambient temperature sensor, a navigation positional sensor and a weather data source, the first estimator is configured to identify an occupant article of clothing based upon the climate data.

10. The system of claim 1, wherein the occupant personal parameter includes a distance from the thermal effector.

11. The system of claim 10, comprising a seat adjuster having a position sensor in communication with the controller, the second estimator configured to predict the occupant anthromorphic characteristics based upon the position sensor and the occupant personal parameters extracted from the image.

12. The system of claim 1, wherein the extractor algorithm is configured to provide distance data relating to occupant physical features that predict the occupant anthromorphic characteristics.

13. The system of claim 12, wherein the occupant physical features include one of shoulder width, hip width, torso length, neck position, head position.

14. The system of claim 12, wherein the extractor algorithm is configured to perform facial recognition, and the second estimator is configured to predict one occupant age, occupant gender and occupant weight.

15. A method of controlling an occupant microclimate system, the method comprising:

capturing an image of an occupant;

extracting occupant personal parameters based upon the image;

estimating an occupant clothing insulation value based upon the occupant personal parameters;

estimating an occupant anthromorphic characteristic based upon the occupant personal parameters; and regulating a thermal effector of a component based upon the occupant clothing insulation value and the occupant anthromorphic characteristic.

16. The method of claim 15, wherein the component is one of a seat, a steering wheel, a shift knob, a floor mat, and a headliner, and wherein the thermal effector is one of a thermoelectric device, a vent, a micro-compressor, and a heater.

17. The method of claim 15, wherein the first estimator is configured to identify an occupant article of clothing, and the first estimator configured to determine the occupant clothing insulation value for the occupant article of clothing in a look up table.

18. The method of claim 15, wherein the occupant personal parameter includes a distance from the thermal effector.

19. The method of claim 15, wherein the extractor algorithm is configured to provide distance data relating to occupant physical features that predict the occupant anthromorphic characteristics, and wherein the occupant physical features include one of shoulder width, hip width, torso length, neck position, head position.

20. The method of claim 15, wherein the extractor algorithm is configured to perform facial recognition and predict one occupant age, occupant gender and occupant weight.

* * * * *